July 25, 1944.　　F. W. BEDFORD　　2,354,633
PROCESS FOR PRODUCING FRUIT OR VEGETABLE JUICE CONCENTRATE
Filed May 22, 1943
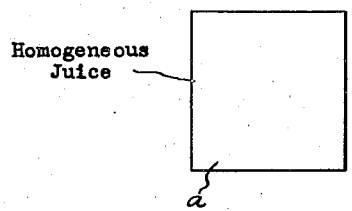
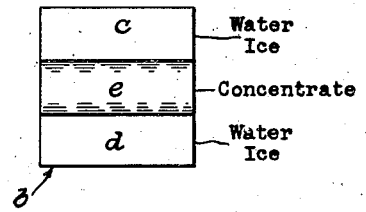
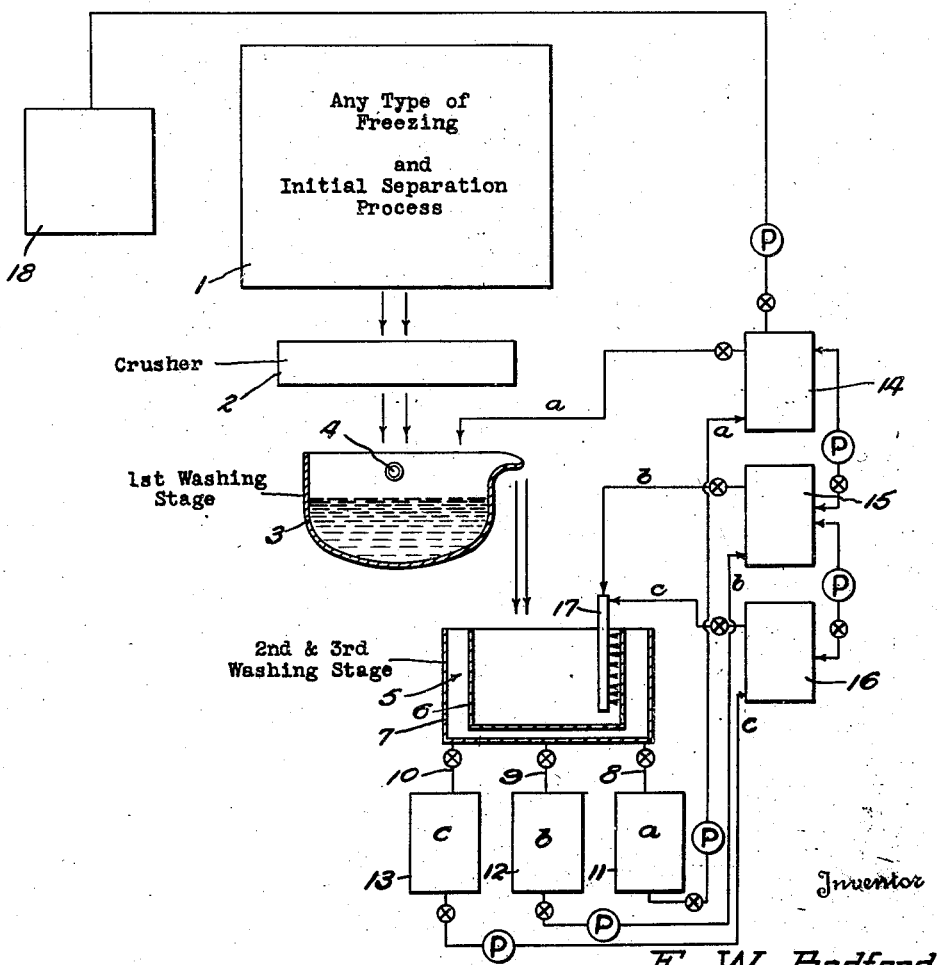
Inventor
F. W. Bedford
By Mason Fenwick & Lawrence
Attorneys Patented July 25, 1944

2,354,633

UNITED STATES PATENT OFFICE 2,354,633

PROCESS FOR PRODUCING FRUIT OR VEGETABLE JUICE CONCENTRATE

Frederick W. Bedford, Dunkirk, N. Y., assignor to Bedford Products, Dunkirk, N. Y., a partnership Application May 22, 1943, Serial No. 488,030

10 Claims. (Cl. 99—205)

This invention relates to the recovery of valuable constituents from the ice when any liquids are concentrated by freezing, and particularly when fruit and vegetable juices are so concentrated.

This invention has for its general object the provision of a process, adjunctive to methods of concentration which involve freezing the juice and removing concentrate from the resulting ice mass by any means such as centrifuging or pressing, for recovering the juice solids remaining in the ice mass by one or more washings of the ice mass in a controlled juice liquor, which liquor itself, built up in solids, finally becomes the subject of concentration by freezing.

By "solids" is meant in general, all juice constituents other than water, including fruit sugars, protein, tannin, acid, pectin, color and flavor principles, vitamins, etc., which are normally in solution or suspended in the juice and the term when applied to the concentration of other liquids than fruit or vegetable juices refers to those substances segregated from the water of ice crystallization, and which contribute to the build-up of density in the concentrate.

By "liquor" is meant a fraction of the same juice or other liquid being concentrated, and which is employed for the washing of the ice mass, and which itself, finally built up in solids content becomes the subject of concentration by freezing.

The invention is illustrated in the accompanying drawing which forms a part of the specification, in which Figures 1 and 2 are diametric representatives illustrating the concentration of juice by ice crystallization.

Figure 3 is a flow sheet illustrating the process of the subject invention.

The principle of concentration by freezing is founded upon the mechanics of ice crystallization which forces the juice solids into the intercrystalline spaces, the crystals themselves being of substantially pure water withdrawn from the juice.

Methods for concentrating juices by freezing are preferred to other processes such as those which involve heating the juice or evaporating the water therefrom under vacuum, in that in the latter type of process much of the volatile flavor esters is lost through evaporation and the vitamin content deteriorated through heating.

However, freezing processes of concentration as ordinarily practiced do not conserve all of the solids, for reasons which will be readily understood by referring to Figures 1 and 2.

The square $a$ represents a small unit of juice before freezing, in which all of the solids are homogeneously distributed. The square $b$ represents the same unit after having been frozen, the areas $c$ and $d$ representing adjacent ice crystals of pure water, and the intervening area $e$ representing the juice concentrated in the space intervening between the two crystals. Now, when the crystals $c$ and $d$ were in the incipient stage, that portion of the concentrate in the middle of the area $e$ is forced out, the remaining liquid saturating the crystals rising in concentration. As the crystals solidfy, the rest of the concentrate is forced out, occupying a position adjacent and adherent to the surface of the crystals. Due to the viscosity of the concentrate, diffusion is slow, so that the concentrate which coats the surfaces of the crystals remains more dense in solids than the middle portion of the body of concentrate in the area $e$. When concentrate is extracted from the ice mass either centrifugally or by pressing, it is the intermediate portion which is removed, that which adheres to the crystals being left in the ice mass and ordinarily wasted. Thus, a disproportionate part of the solids, including part of the flavor, vitamin content and other desirable qualities of the juice, is lost.

By the process of the present invention, not only is substantially all of the juice concentrate removed from the ice mass, but as the result of this substantially complete extraction of the concentrate, all of the natural flavor and vitamin content is conserved.

To make concentration by freezing of commercial value, the changing of the water in a juice to a crystalline ice structure should be done in a relatively short time and in units that can be readily handled. As a general condition, the quicker the freezing, the lower the concentration and the less easily can the concentrate be separated from the ice. But methods of increasing speed without loss of concentration are known to the industry. Also as the concentration increases, due to better freezing conditions, the more viscous will be the liquid portion and consequently the loss on centrifuging or pressing will be greater. It is readily proven that the higher concentration a juice is given, the more valuable it becomes. Also that a constantly less amount of water has to be removed as the concentration increases to increase that concentration a given percent or volume reduction.

Under all the above and other conditions and because of the increased value of higher concentrates, it will be readily seen that the important part of the method of concentration by freezing is the complete recovery of the solids from the ice, thus allowing the selection of the most economical method of freezing and one that will give a high concentration of solids and most easily washed free from ice. It is not the object of this invention to propose any new method for freezing juices, but to make more practical any desired method by providing a means of saving the fruit solids containing all the original valuable ingredients.

Referring now to the flow sheet, Figure 3, this illustrates by way of example, a specific embodiment of my invention, in which grape juice is the liquid treated and a liquor of the same juice employed as the washing agent. The rectangle 1 represents any freezing process, from the ice mass of which as much as possible of juice concentrate has been removed by centrifuging, pressing or in any other manner, leaving the ice mass with residual adherent concentrate filling the interstices between the ice crystals. This freezing process is not in itself a limiting part of the subject invention.

The reject ice mass from the freezing process 1 is discharged into a crusher 2, in which it is comminuted. The ice is preferably at sub-freezing temperature. A tank 3 is below the crusher. As shown, it is tiltable about trunnions 4.

Below the tank 3 is a centrifuge 5 comprising the rotary basket 6 and a surrounding liquor collecting chamber 7. The flow sheet shows the collecting chamber 7 provided with three selectively useable valved outlets 8, 9 and 10, discharging into the respective receivers 11, 12 and 13.

The receivers 11, 12 and 13 are piped to respective reservoirs 14, 15 and 16, a pump P being in each of the pipes for transferring liquor from the receiver to the reservoirs.

The reservoir 14 has a valve-controlled pipe discharging into the tank 3. The reservoirs 15 and 16 have selectively useable valved discharge pipes communicating with a laterally perforated spray nozzle 17, extending within the basket 6 of the centrifuge, and preferably adjacent one side thereof.

A removable bag or other liquor permeable ice container, not shown, is preferably arranged within the basket of the centrifuge to permit the spent ice mass to be removed from the centrifuge. To facilitate the removal of this spent ice container, the spray nozzle 17 may be lifted out of the way.

In the illustrated layout, the ice mass from the freezing process is subjected to three stages of washing. The number of washings is, however, immaterial to the invention. The first washing takes place in the tank 3 with juice liquor from the reservoir 14. The other washings are performed in the centrifuge 5, sequentially by way of the nozzle 17, with juice liquor from the respective reservoirs 15 and 16.

Since the residual concentrate in the ice mass will become less dense with each washing, and it is essential for efficient extraction of the residual concentrate that the washing liquor at each stage be weaker than the residual concentrate with which it mixes, the liquor in reservoir 15 is weaker than that in reservoir 14, while that in reservoir 16 is weaker than that in reservoir 15. By way of example, the concentration of liquor in reservoir 14 may be 10° Brix, that in reservoir 15, 5° Br., and that in reservoir 16, 3° Br. The reservoirs 14, 15 and 16 are serially connected by pipes in which pumps P are intercalated so that liquor from one reservoir may be pumped into the next reservoir containing liquor of higher concentration, and the reservoir 14 is piped to a juice supply tank 18 with a pump P interposed in said pipe for discharging from the reservoir 14 into said juice tank.

The wash liquor throughout the process is normally kept at a temperature slightly below the freezing point of water, but may upon occasion, as will appear, be raised above freezing temperature.

The process may now be traced. The ice mass from the freezing process 1, from which concentrate has been withdrawn by centrifuging or pressing, is discharged into the crusher 2 where it is comminuted and then deposited in the tank 3. Either before or after the ice mass has been dumped into the tank 3, sufficient juice liquor from the reservoir 14 is run into the tank 3 to float the ice mass. Then the ice mass is stirred in the body of liquor in said tank.

The tank 3 is then tilted, pouring the mixture of ice and liquor into the basket 6 of the centrifuge 5. By this time the juice liquor has risen, say, to 12° Br., while the density of the residual concentrate in the ice mass which may have been 35° Br. at the start has fallen to, say, 14° Br. The centrifuge is operated and the liquor at 12° Br. thrown into the collecting chamber 7, from which it is discharged into the receiver 11. From time to time, as the receiver 11 becomes filled, its contents, or a part thereof, is pumped back into the reservoir 14 for re-use. This raises the specific density of the juice liquor in said reservoir to a concentration of, say, 11° Br. This completes the first washing.

The valved discharge to the receiver 11 is then closed and the ice mass in the centrifuge 5 with residual juice concentrate at 14° Br. is subjected to the second washing with juice liquor from the reservoir 15 at a concentration of, say, 5° Br. sprayed against the ice mass in said centrifuge from the nozzle 17. The centrifuge may be operated while the ice mass is being sprayed. The liquor from the second washing which has built up a density of, say, 7° Br. collects in the collecting chamber 7, from which it is discharged into the receiver 12 and pumped from the latter into the reservoir 15, raising the concentration of liquor in said reservoir to, say, 6° Br. Some of the liquor from the reservoir 15 may be pumped into the reservoir 14 to bring its concentration down to the original density of 10° Br., and the liquor in reservoir 15 may be diluted back to 5° Br. by adding some weaker liquor pumped from the reservoir 16.

At the end of the second washing the residual concentrate in the ice mass in the centrifuge basket is down to a density of, say, 4° Br. The process may be considered finished at this point, but it is generally desirable to make a further recovery of the residual concentrate; hence, the third washing step.

The discharge from the centrifuge to the receiver 12 is closed and liquor from the reservoir 16 at a density value of, say, 3° Br. is sprayed against the ice mass in the centrifuge and the liquor which has increased in solids to, say, 4° Br. is collected in the chamber 7 and discharged into the receiver 13 from which it is pumped into the reservoir 16.

After the third washing, the ice mass in the centrifuge basket retains only a trace of the juice, and may then be removed from the centrifuge to be used for refrigeration or other purposes. Some of it may be conveniently melted and added as ice water to the liquor in reservoir 16 to dilute it down to its original concentration.

It is, of course, obvious that the aggregate liquor in reservoirs 14, 15 and 16 progressively increases in concentration as well as in bulk through repeated washings, so that from time to time it becomes necessary to withdraw some of it from circulation. The part so withdrawn is taken from the reservoir 14 containing liquor of higher concentration. This is delivered to the body of original juice in the tank 18, which supplies material for the freezing process. Since the juice liquor in reservoir 14 is generally of lower solids content than the body of original juice, and it may not be desired to dilute the original juice, in the interest of obtaining maximum concentration in the freezing process, the concentration of juice liquor in reservoir 14 may be built up by circulating it as the first washing step for several successive batches of ice mass without diluting it with liquor from the reservoir 15.

In the embodiment of the process, as above described, the washing liquor throughout is normally somewhat below the freezing temperature of water, and the ice mass throughout is at a lower temperature than the contacting liquor, so that the ice mass may be considered a dry body throughout, and does not contribute to the dilution of liquor within the bounds of the process. Such ice as was melted was heated extraneous to the process and the resulting water used to dilute the liquor in reservoir 16.

It may, however, upon occasion, be advantageous to dilute the washing liquor in situ in any of the washing steps. This may be accomplished by temporarily raising the temperature of the washing liquor above freezing, either immediately before or during its application to the ice mass in said step. This has the effect of melting some ice, diluting the liquor, and constituting a control for the building up of solids in the washing liquor. It has the further advantage that the surface of the ice crystals carrying the relatively viscous film of residual concentrate is melted, thereby detaching the film of concentrate from the ice crystals and providing local and immediate dilution of said concentrate. The degree to which the washing liquor is heated determines the amount of dilution. Ordinarily, its temperature will be raised only slightly above freezing so that it will be reduced below freezing point by contact with the ice and further dilution thus limited.

It will be readily appreciated from a contemplation of the process as above described that the inventive concept embraces two phases, first, a stage extraction of residual concentrate from the ice mass in descending order of the density of the concentrate, and second, the stage building up of the density of the washing liquor in ascending order with respect to density, with the end step of delivering the washing liquor of highest density to the freezing process for separating out concentrate of still higher density which ordinarily may be regarded as the commercial product. The invention also includes the factors of control which correlate these two phases, including the temperature, density and volume of the washing liquor employed in the several washing stages.

The duration of the washing periods is determined as a matter of judgment on the part of the operator, and more particularly upon the celerity with which succeeding batches of the ice mass are made available for washing. While the flow sheet illustrates the crusher supplied from a single source of ice, it is readily understood that it may be supplied from several sources, alternately, successively, or otherwise in the interest of speeding production.

While I have in the above description disclosed what I believe to be a preferred and practical embodiment of my invention, it will be understood to those skilled in the art that certain of the sequences of operation as well as the technique employed may be varied within limits without transcending the scope of the invention as defined in the appended claims.

What I claim as my invention is:

1. Process for recovering the residual concentrate in the ice mass of frozen fruit or vegetable juice following separation of juice concentrate by centrifuging, pressing, etc., comprising subjecting the ice mass to successive washing stages in which the density of the residual concentrate is reduced by each washing, employing as the washing agent fractions of liquor of the same juice, one for each washing stage, each fraction being of less density at the beginning of the washing stage in which it is employed than the concentrate in the ice mass to which it is applied, separating the washing liquor, built up in density, from the ice mass at the end of each washing step, diluting the fraction of washing liquor of lowest density back to normal working density, and diluting the fraction of higher density by adding to each a portion of a fraction of lower density.

2. Process as claimed in claim 1, the temperature of the ice mass and the washing liquor being normally below the freezing point of water and the temperature of the washing liquor being normally above the temperature of the ice mass.

3. Process for recovering the residual concentrate in the ice mass of frozen fruit or vegetable juice following separation of juice concentrate by centrifuging, pressing, etc., comprising subjecting the ice mass to successive washing stages in which the density of the residual concentrate is reduced by each washing, employing as the washing agent fractions of liquor of the same juice, one for each washing stage, each fraction being of less density at the beginning of the washing stage in which it is employed than that of the concentrate in the ice mass to which it is applied, separating the washing liquor, built up in density, from the ice mass at the end of each washing stage, removing a portion of the fraction of the highest density for further concentration treatment, diluting the portion of lowest density back to normal working density, and diluting the fractions of higher density by adding to each a portion of a fraction of lower density.

4. Process as claimed in claim 3, the temperature of the ice mass and washing liquor being normally below the freezing point of water and the temperature of the washing liquor being normally above the temperature of the ice mass.

5. Process for recovering the residual concentrate in the ice mass of frozen fruit or vegetable juice following separation of juice concentrate by centrifuging, pressing, etc., comprising subjecting the ice mass to successive washing stages in liquor of the same juice, the density of the liquor employed in each washing stage being less at the beginning of said stage than the density of the concentrate in the ice mass to which it is applied, separating the washing liquor from the ice mass at the end of each washing step, and controlling the build up of density of the washing liquor by selectively controlling, in each washing stage, the following factors, volume, temperature and density of the washing liquor.

6. Process for recovering the residual concentrate in the ice mass of frozen fruit or vegetable juice following separation of juice concentrate by centrifuging, pressing, etc., comprising subjecting the ice mass to successive washings in which the density of the residual concentrate is reduced by each washing, employing as the washing agent a fraction of liquor of the same juice, one for each washing stage, each fraction being of less density at the beginning of the washing stage in which it is employed than that of the concentrate in the ice mass to which it is applied, separating the washing liquor, built up in density, from the ice mass at the end of each washing stage, employing the fraction of highest density a plurality of times to enhance its density, removing a portion of the fraction of highest density for further concentration treatment, diluting the fraction of lowest density back to normal working density and diluting the fractions of higher density by adding to each a portion of a fraction of lower density.

7. Process for concentrating fruit and vegetable juices comprising freezing the juice and initially separating concentrate from the resulting ice mass in any suitable manner, stirring the reject ice mass and residual concentrate in a body of juice liquor drawn from a reservoir of said liquor at density less than that of the residual concentrate in the ice mass, then depositing the mixture of ice mass and liquor into a centrifuge, centrifugally separating the liquor from the ice mass, collecting the liquor in a first receiver, spraying the ice mass in the centrifuge with juice liquor from a second reservoir of liquor at less density than that in the first reservoir, centrifuging and collecting the liquor into a second receiver, then again spraying the ice mass in the centrifuge with a juice liquor from a third reservoir of liquor of less density than that in the second reservoir, centrifuging and collecting the liquor into a third receiver, delivering the liquor from said receivers to the corresponding reservoirs from which it emanated, diluting the liquor in the reservoir of lowest density and diluting the liquor in the reservoirs of liquor of higher density by adding thereto a portion of the liquor from the reservoirs of liquor of lower density.

8. Process as claimed in claim 7, including the step of crushing the ice mass prior to the first washing.

9. Process as claimed in claim 7, a portion of the liquor being removed from the reservoir of liquor of highest density prior to dilution, to be subjected to the freezing process.

10. Process for recovering the residual concentrate in the ice mass of frozen fruit or vegetable juice following separation of juice concentrate therefrom by centrifuging, pressing, etc., comprising subjecting the ice mass to successive washing stages in liquor of the same juice, the density of the residual concentrate in the ice mass being reduced by each washing and the density of the liquor employed in each washing stage being less at the beginning of each stage than the density of concentrate in the ice mass to which said liquor is applied, separating the washing liquor from the ice mass at the end of each washing stage, maintaining the temperature of the ice mass and the washing liquor generally below the freezing point of water throughout the process and the temperature of the washing liquor normally above the temperature of the ice mass and producing localized dilution in situ in any washing stage by raising the washing liquor in said stage slightly above the freezing point of water thereby melting some ice.

FREDERICK W. BEDFORD.